COANDA DEFLECTION ANGLE 45°–90°

INVENTOR
DONALD C. WHITTLEY

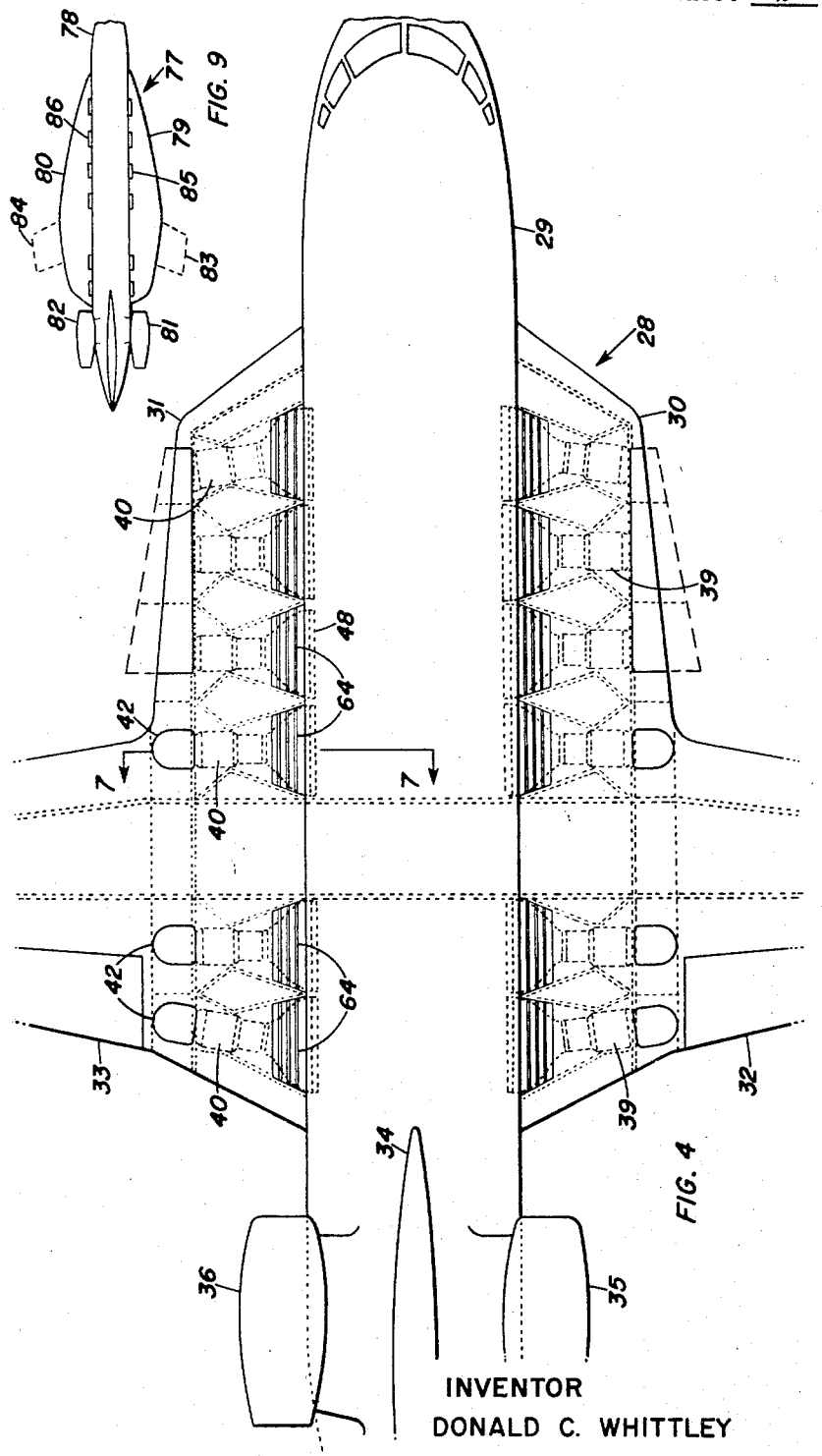

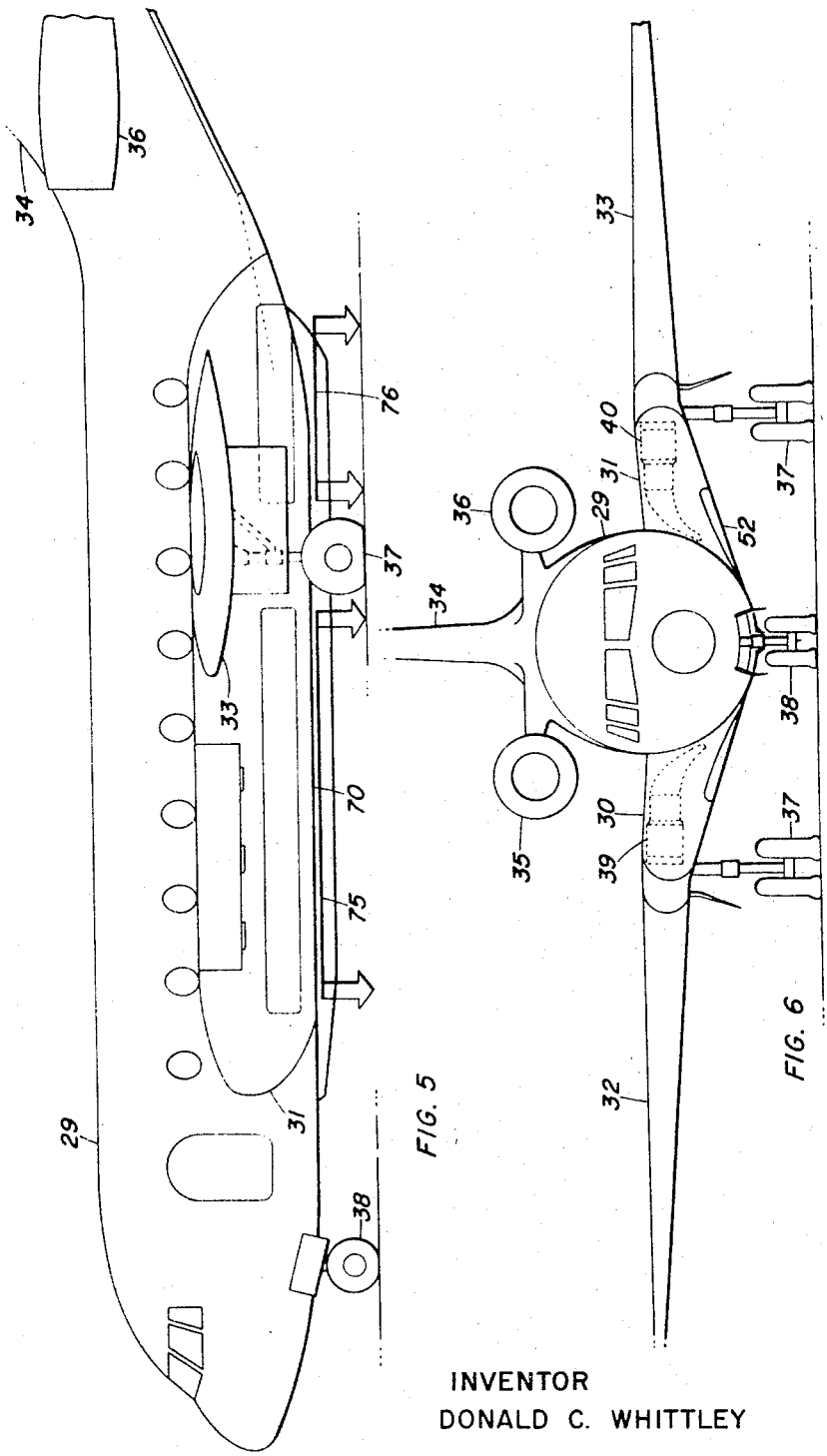

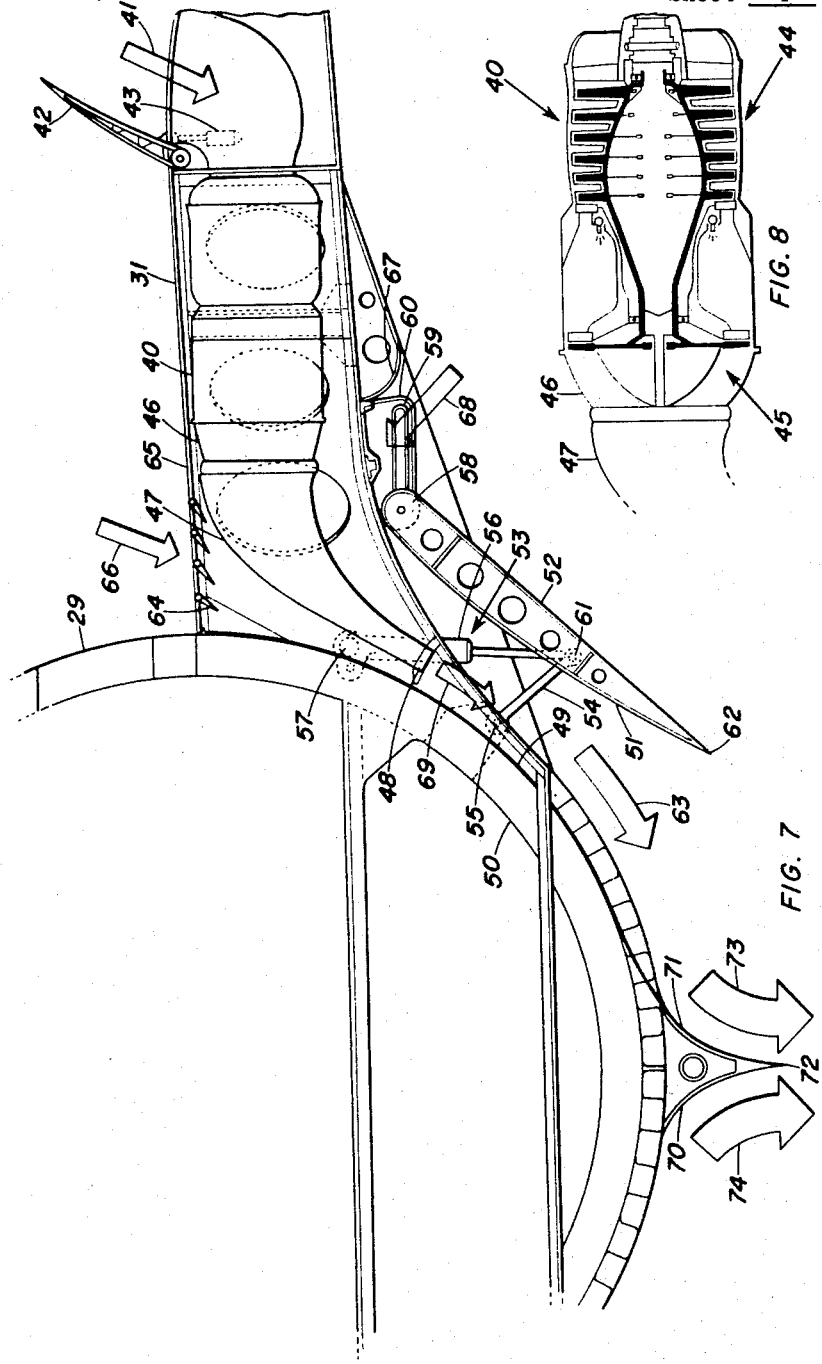

Feb. 25, 1969    D. C. WHITTLEY    3,429,527
VERTICAL TAKE-OFF WINGED AIRCRAFT STRUCTURE AND METHOD
Filed Jan. 19, 1966    Sheet 5 of 6
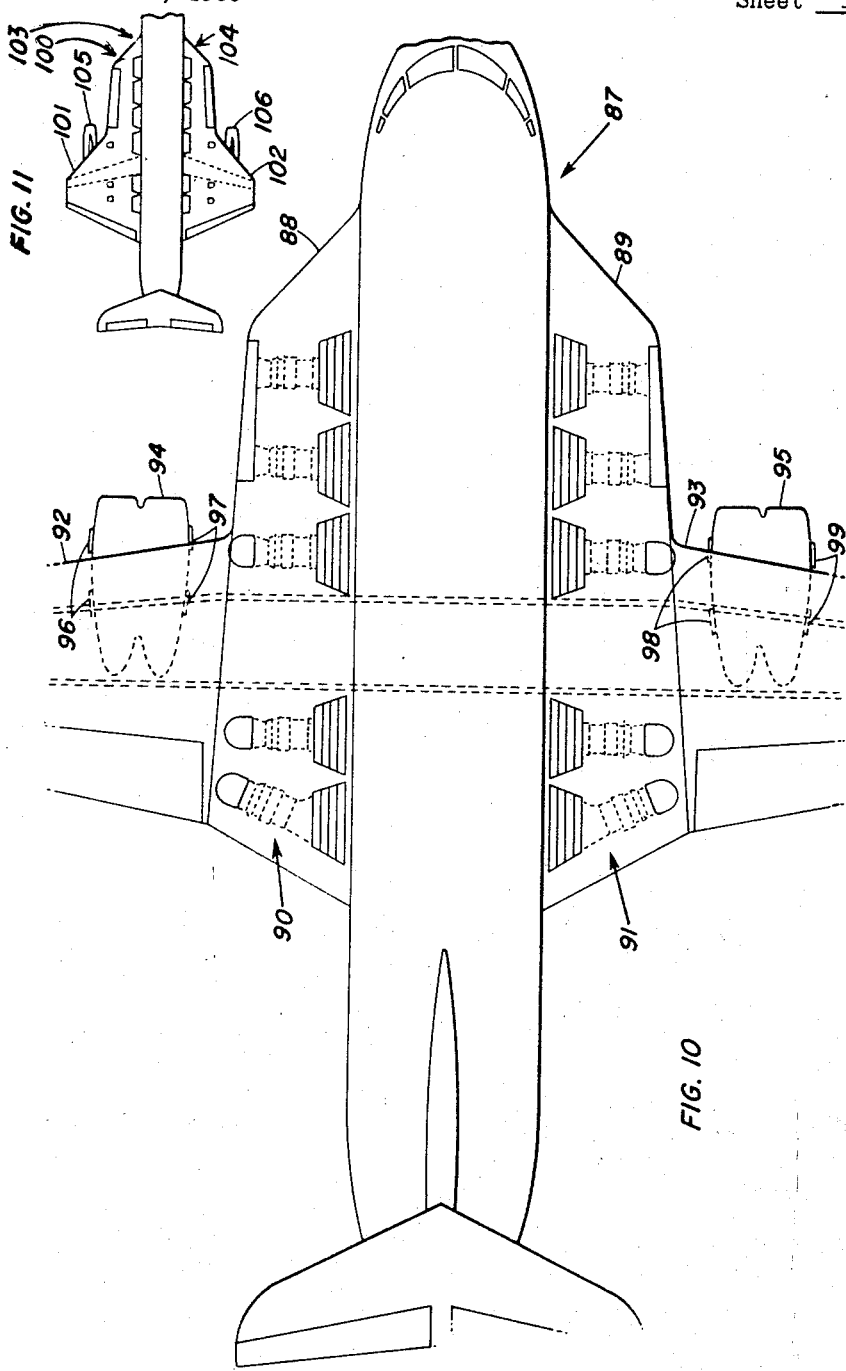
INVENTOR
DONALD C. WHITTLEY

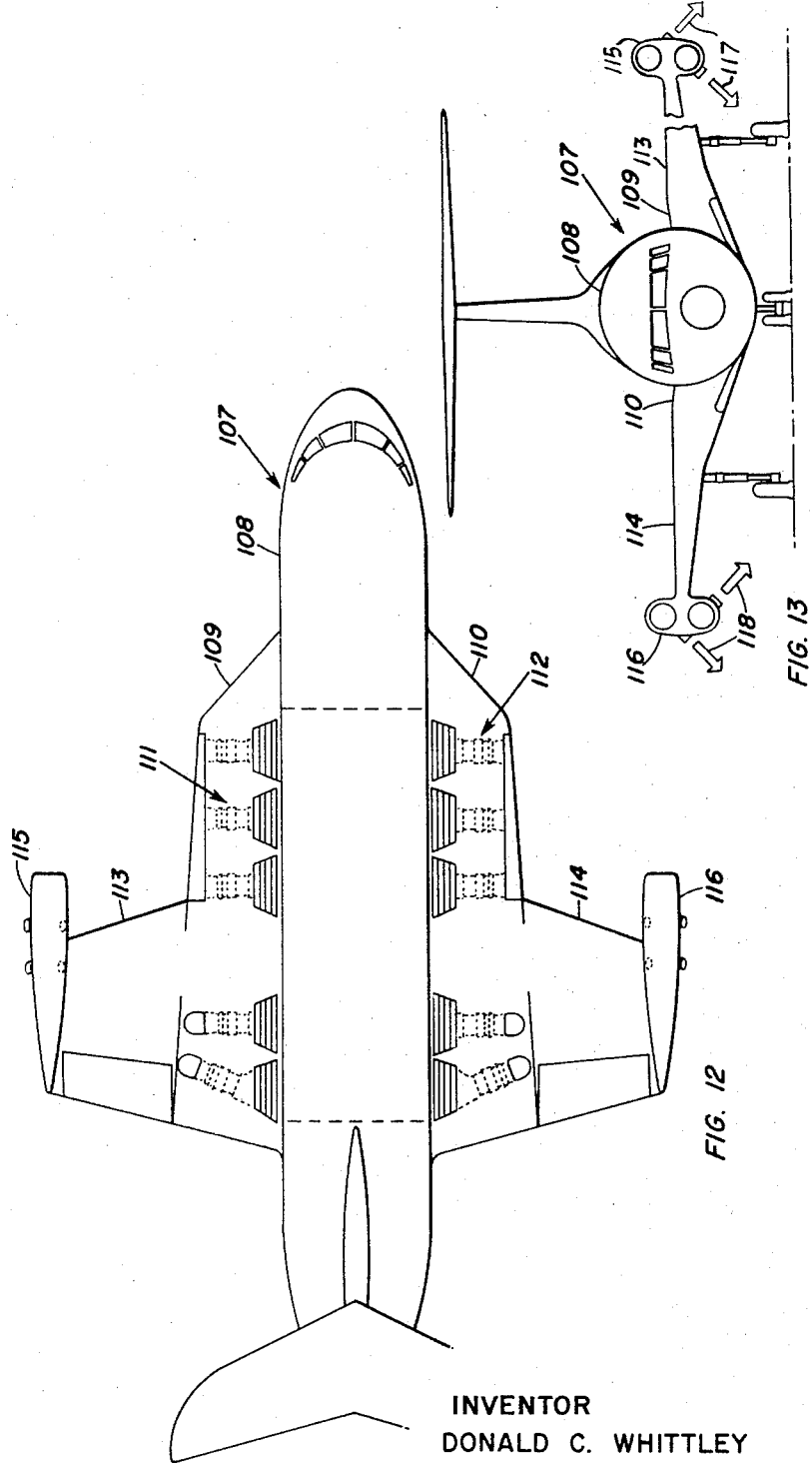

United States Patent Office 3,429,527
Patented Feb. 25, 1969

3,429,527
VERTICAL TAKE-OFF WINGED AIRCRAFT STRUCTURE AND METHOD
Donald Charles Whittley, Islington, Ontario, Canada, assignor to The de Havilland Aircraft of Canada Limited
Continuation-in-part of application Ser. No. 426,602, Jan. 19, 1965. This application Jan. 19, 1966, Ser. No. 521,576
U.S. Cl. 244—12                    5 Claims
Int. Cl. B64c 15/00, 29/00, 3/38

ABSTRACT OF THE DISCLOSURE

A winged aircraft embodies vertical lift augmenting devices in the form of plural jet engines having nozzles spaced from the fuselage in such manner as to project a free jet stream through an air inducting gap toward undersurfaces to which jet gases and entrain air attach and flow to join in a downwardly directed thrust steam below the fuselage. The spacing of the nozzle, from the attaching surface for inducting large quantities of air, is termed a jump Coanda system.

---

This application is a continuation-in-part of application Ser. No. 426,602 (abandoned).

This invention relates to a method and apparatus for propulsion of craft in fluid media and more specifically to a winged aircraft embodying same.

The history of the technology of motion of a craft through a fluid medium evidences two main ways of overcoming gravity. One well-known method embodies provision of an airfoil or hydrofoil section adapted during forward motion thereof to effect a more rapid surface motion of the fluid medium over the upper surface than the lower surface, thereby to create a difference in pressure and a resulting lift. The other way of providing a vertical lift has been to provide a propulsive effect directed vertically sufficient to overcome the force of gravity and the buoyancy of the craft in the fluid medium. While in a fluid such as water the thrust weight ratio or propulsion rate ratio may be satisfactory to provide a net vertical lift or propulsive effect, the problems associated with vertical lift in air by direct vertical propulsion have been subjected to a variety of treatments as to propulsive principle, all of which reduce to the necessity of effectively pumping large volumes of air vertically and downwardly. Rotary fans and like devices including jet engines mounted vertically either limit the structural design of an aircraft for normal forward flight in other respects, or give rise to ground take-off characteristics as for example erosion of the ground surface, noise, and other problems which limit the wide-spread adoption thereof.

Some efforts have been made in the past to adapt the "Coanda effect" to aircraft propulsion, for example as described in British patent Specification No. 456,063, whereby a jet of gas emerging from an orifice can be deflected to adhere to a surface situated obliquely to the axis of the jet. This effect can be demonstrated by holding a smoothly rounded edge of a plate of a given thickness adjacent a jet emerging from a slit or orifice having a width or "thickness" less than the thickness of the plate, the said edge being disposed substantially parallel to the length of the orifice. Even though the plate is inclined obliquely to the plane of symmetry of the jet, the jet will be deflected around the edge of the plate and will adhere to the surface of the plate remote from the orifice. Under certain conditions the jet can be deflected through nearly 180° by this means. Air is entrained in an unobstructed jet, causing an apparent increase in the angular divergence of the jet as it leaves the orifice. If the entrainment on one side of the jet is obstructed in relation to the entrainment on the other side of the jet, the jet will be diverted and will adhere to the obstructed side. Conversely, if a contribution is made to the entrainment on one side of the jet, the jet will be diverted away from the side receiving the addition to the entrainment. In the first case the diversion of the jet is a result of the reduction of pressure between the jet and the obstruction. However if other means are provided for introducing air between the jet and the obstruction the pressure difference will be destroyed and the jet will break away from the surface downstream of the point at which air was introduced.

The Coanda effect was employed in British Patent 898,358 published June 6, 1962 relating to a vertical take off aircraft of the flying saucer type in which a rolled edge perimeter of the aircraft was subjected to a radially directed jet over the upper peripheral surface thereof whereby said jet was drawn downwardly by the Coanda effect to effect a downward thrust, such thrust could be rendered truly radial by injecting air from a point forwardly to the Coanda surface whereby the jet projected free thereof and radially laterally.

The disadvantage of prior use of the Coanda effect, when utilized as the sole reliability for vertical lift to overcome the weight of the aircraft is the relatively low effectiveness of such a device to pump a sufficient volume of air. In prior applications of the Coanda effect supplemental air has been permitted to attach to the attached jet stream; that is the jet stream attached to the curved Coanda surface to the convex surface thereof only.

It is the main object of this invention to provide a method and apparatus for propelling craft, for example in a direction opposite to gravity, by utilizing the Coanda effect relative to a jet stream but causing the jet stream to jump a gap before attaching to a Coanda surface whereby to entrain a fluid medium such as air from all directions to which said gap is exposed, thus greatly to augment the effectiveness of the Coanda type pumping system.

It is a further object of the invention to provide a method and apparatus as before so arranged relative to the fuselage of an aircraft structure or the structure of a craft adapted to hover and travel at a height spaced from the ground or water surface, as to utilize the undersurface shape of the fuselage itself, at least partially as a Coanda surface but in such manner as to provide a gap adapted to pump large volumes of air augmenting the jet stream attaching to the undersurface contours of the craft.

It is a further object of the invention to provide a method and apparatus of the invention wherein vertical propulsive forces are drawn by Coanda surfaces to a narrow propulsive region relative to the lateral dimension of the craft whereby to avoid overturning moment and lack of stability particularly in the event of an engine failure.

Other objects of the invention will be apparent from a study of the following specification taken in conjunction with the accompanying drawings.

In the drawings:

FIGURE 4 is a plan view of one suitable style of aircraft embodying the invention.

FIGURE 5 is a side elevation of the craft of FIGURE 4.

FIGURE 6 is a front elevation of the aircraft of FIGURES 4 and 5.

FIGURE 7 is a section looking in the direction of the line 7—7 of FIGURE 4.

FIGURE 8 is an axial section of a typical jet engine of a type adapted to be employed in an aircraft in the configuration and design of FIGURES 4 to 7.

FIGURE 9 illustrates a modified form of aircraft in plan of the general kind indicated in FIGURE 4 but adapted to embody extensible wing elements.

FIGURE 10 is a plan view of a modified form of aircraft design having main wing lift-cruise engines substantially inboard of the main wing structure.

FIGURE 11 is a small full plan view of the aircraft of FIGURE 10 indicating the influence of the invention on aircraft design of this type.

FIGURE 12 is a plan view of a still further different style of aircraft having wing tip lift-cruise engines indicating the influence of the invention on the design thereof, and, FIGURE 13 is a front elevation of the aircraft of FIGURE 12 indicating a further feature according to the invention in providing assistance of the wing tip engines in a vertical lift.

Figure 1:
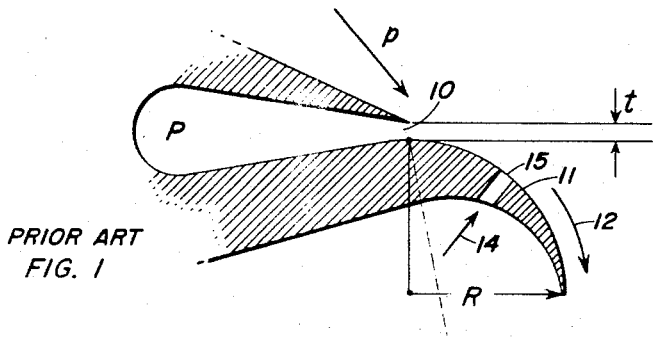
FIGURE 1 is a diagram of the Coanda method illustrating its modification as practised in British Patent 898,358 assigned to the same assignee as the assignee of the instant application.
Figure 3:
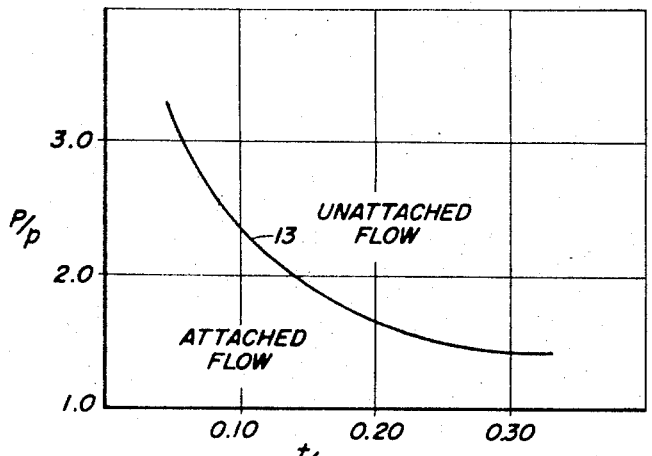
FIGURE 3 is a curve of the approximate critical value of jet source pressure to fluid medium pressure relative to the gap geometry of this invention to maintain attached flow and the augmenting characteristics according to this invention. P is the absolute total jet supply pressure; $p$ is the absolute static pressure of the ambient atmosphere.

Referring to FIGURE 1 and the conventional form of Coanda system illustrated thereby it is to be observed that a jet stream emits from slit nozzle opening 10 from the jet source which may be identified by the pressure source P. The convex surface 11 extends substantially tangentially from the slot 10 and one side thereof. The slit sometimes referred to herein as a slot orifice or jet determines the width or thickness of the jet stream $t$ which must be small relative to the effective radius R of the convex surface 11. As the ratio $t/R$ becomes large the critical value of $P/P$ decreases wherein $p$ represents the pressure of the surrounding fluid medium. The critical value is that value of $P/P$ above which the jet will no longer attach to the Coanda surface 11. The jet stream from gap 10 of FIGURE 1 is augmented by air on the convex surface thereof only as it passes over Coanda surface 11 to project therefrom by path 12. The conditions for curved flow are shown diagrammatically by FIGURE 3 disclosing an attached flow curve 13 within which the indicated ratios of pressure and jet thickness to Coanda radius are revealed to avoid unattached flow that is the breaking of the jet away from the Coanda surface 11. It is of interest in the prior art, as for example in British Patent 898,358 above referred to that the Coanda effect may be spoiled by the injection of air in the direction of arrow 14 through an opening 15 to the convex Coanda surface 11 realizing the entrainment of the jet thereon. Such means for controlling the direction of a jet stream is also of use in the present invention but it must be observed that such air injection must take place on the Coanda surface itself rather than in advance thereof.

Figure 2:
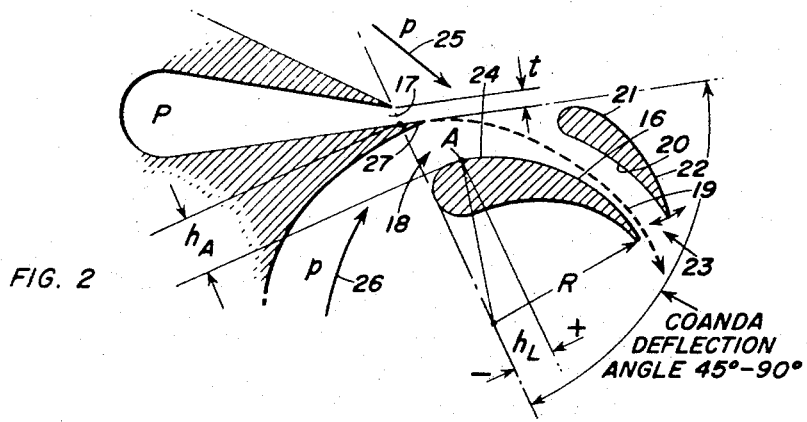
FIGURE 2 is a corresponding diagrammatic representation of the improved Coanda method of this invention providing augmentation.

The present invention, which in its elementary aspects is indicated in FIGURE 2, operates insofar as the Coanda effect itself in a similar manner to that of FIGURE 1 save and excepting the great difference made to the effectiveness thereof by providing a displacement of tangent point A at the beginning of the radius of Coanda curvature of the Coanda surface 16 which locates point A both outwardly and downwardly relative to the jet nozzle or slit 17 as indicated by outward dimensions $h_L h_A$ respectively; positive directions being as shown. The invention thus provides gap 18 defined by tangent displacement $h_A$ and outward displacement $h_L$ hereinafter referred to as a displacement gap or jump gap, enabling the entrainment of fluid medium such as air not only by the convex surface of the jet over the Coanda surface 16 but by the concave surfaces thereof as the same jumps the gap by the path of the chain lines 19. Accordingly, the convex surface 20 of jet 19 is exposed to atmospheric air over the entire surface thereof or substantially so as may be permitted by control element 21 disclosed in more detail hereinafter movable at its control tip 22 to determine the outlet gap 23 while the inner concave jet surface 24 is attached to entrain augmenting atmospheric air through gap 18. The two sources of atmospheric air are generally indicated by arrows 25 and 26 respectively. The arrangement disclosed in FIGURE 2 for purpose of convenience may hereinafter be referred to as a "jump Coanda" and will be characterized by a slight overhang or forward projection 27 of the lower lip of the slit or nozzle. While the same is not essential it has been found to give a smoother flow of the augmenting air entrained through the gap 18. Tests according to the invention have indicated that the value of $h_A/t$ should be not greater than about $h_A/t=19$ otherwise the jet stream may not successfully jump the gap 18 and will not attach. Further at high values of pressure ratio the gap should be slightly less. The outward displacement $h_L$ however should be less than the tangent displacement $h_A$ but greater than about 10% thereof. For example in the jump gap arrangement of FIGURE 2 at an $R/t$ ratio=20 the jet remained attached up to a gap ratio that is $ha/t=8$ at a displacement ratio $hl/t=-2.5$ whereas attachment was maintained up to a gap ratio of $ha/t=10$ at a displacement ratio $hl/t=+2.0$.

The application of the foregoing to aircraft design and to specific aircraft of the invention is disclosed in the following figures. In particular the invention concerns aircraft structures especially of three main types differentiated mainly by the location of the forward propulsion engines being located in the tail; lift-cruise engines located in the inboard wing regions or the outboard wing regions.

With reference to FIGURE 4, FIGURE 5, and FIGURE 6 a typical aircraft structure provided to incorporate the features of the present invention is illustrated and is intended to represent in general such an aircraft structure, but is not intended to be limiting in the sense of a particular design. The aircraft structure indicated generally as 28 comprises a fuselage portion 29 provided with inner wing panels 30 and 31, and outer wing panels 32 and 33, and the tail assembly as at 34.

In other respects the aircraft resembles conventional aircraft in that it is provided with the reaction engines 35 and 36 for forward thrust and is provided with the wheeled landing gear 37 and 38 for conventional landing and take-off. Additionally, it will be understood that the necessary control surfaces and related equipment would be incorporated into the design of the aircraft, this not being shown in the drawings for the sake of clarity and for the reason that such equipment is conventional.

Located within the inner wing panel 30 and 31 are elements and structure according to the present invention which comprise in part the starboard engines 39 and the port engines 40 arranged in parallel rows as shown. With particular reference to FIGURE 7 a section through a portion of the aircraft 28 is shown which illustrates the arrangement of parts within the aircraft producing vertical lift. From the drawing it will be seen that the typical reaction engine 40 is mounted horizontally in the inner wing panel 31 and is provided with the inlet as at 41 having the door element 42 operable by the retraction mechanism 43.

The reaction engine 40 which is shown in section in FIGURE 8 is provided with the conventional compressor section as at 44, a single stage driving turbine as at 45 and the exhaust cone 46. The reaction engine 40 can be selected from the type of turbine reaction engine particularly suitable for vertical lift applications, several types of which are presently available.

A deflection nozzle 47 provides communication for the exhaust gases from the engine 40 and directs the gases downwardly and inwardly relative to the aircraft to exit from the nozzle at 48. The nozzle at 48 corresponds to the jet as provided at 17 in FIGURE 2, the nozzle 48 being elongated in the direction of the length of the aircraft as particularly shown in FIGURE 4.

The slit nozzle 48 projects downwardly and inwardly substantially towards the convex surface as at 49 as defined by the aircraft structure 50. The surface 49 corresponds to the surfaces 16 as shown in FIGURE 2 which is the Coanda surface for the lift system as illustrated in the drawings. A second surface as at 51 is provided on the opposite side of the slit nozzle 48 and is maintained by the structure 52 adjustably held and positioned by the mechanism 53.

The mechanism 53 comprises a link 54 pivoted at the point of attachment 55 on the structure 50 and a retraction and extension jack 56 pivotally supported on the structure 50 at a point 57. The end 58 of the structure 52 is slidably supported within the slot 59 on bracket 60 the other end of structure 52 being supported at 61 by the pivot attachment at this point to the link 54 and the jack 56. Movement of the jack 56 will cause an inward or outward movement of the tip 62 of structure 52 thereby controlling the air flow between the surface 49 and the surface 51, the air flow being indicated by the arrow 63.

The surrounding media or in the case of the aircraft, the surrounding atmospheric air, for the concave surface of the Coanda stream indicated by the arrow 63 is supplied through the louvers 64 in the upper surface 65 of the inner wing panel 31. This supply of air is indicated by the arrow 66. The atmospheric air supply for the convex surface of the Coanda stream is supplied through the gap existing between the end of structure 52 and the edge 67 of the lower portion of wing panel 31 and is indicated by arrow 68. Thus the atmospheric air as indicated by the arrow 66 and the atmospheric air as indicated by the arrow 68 mixes with the effluxes from engine 40 as indicated by the arrow 69 to form the combined stream 63 flowing about the Coanda surface 49. Thus the combined flow as represented by the arrows 41, 66, and 68 flows by means of the engine 40 in a direction downwardly and inwardly relative to the aircraft 28.

A keel structure 70 is provided along the lower centre portion of fuselage 29 and is provided with a concave surface 71 which is a continuation of the Coanda surface 49. The concave surface 71 curves inwardly and downwardly to terminate at the tip 72 the instant position of the surface at this point being in a direction vertically downwardly, the final direction of the stream 63 is thus vertically downwardly as represented by the arrow 73.

It will be noted that the structure and air flows as illustrated in FIGURE 7 are similar for each of the engines 40 and that the structure and air flows are also similar for the engines 39 on the starboard side. Thus the net result of the downwardly directed stream 73 and the opposite and downwardly directed stream as represented by the arrow 74 from the starboard side is a vertically projected stream providing downward thrust and thus lift for the aircraft 28. These streams would run a portion of the length of the aircraft as shown by the extended arrows 75 and 76 in FIGURE 5.

In operation, the doors 42 and the structure 52 will be open to the position as shown in FIGURE 7 and the louvers 64 will also be open as shown. The streams 73 and 74 projecting vertically downwardly will provide lift for the aircraft 28 sufficient to overcome gravity and to lift the aircraft to an elevation of about five hundred feet for transition to forward motion. By thrust of engines 35 and 36 translation may be accomplished or by changing longitudinal attitude forward or rearward translation accomplished. In addition landing can be accomplished in a comparatively short distance, the downwardly projecting streams providing sufficient lift even at a zero landing speed.

With reference to FIGURE 9 an aircraft indicated generally as 77 is illustrated and comprises the fuselage 78 and the inner wing panels 79 and 80. The engines 81 and 82 provide forward thrust and thus far the aircraft is similar in other respects to the aircraft 28 as previously described.

In this embodiment however a pair of extensible wings 83 and 84 are provided movably extended from the wing panels 79 and 80 whereby the lift created by the outer wing panels 83 and 84 can be varied as required upon the aircraft 77 moving forward under the action of the engines 81 and 82. The vertical lift engines as at 85 and 86 provide the necessary vertical lift to support the aircraft for take-off and landing and the panels 83 and 84 provide variation in lift, thereby to provide a smooth transfer of lift force from the means 85 and 86 to the panels 83 and 84, and to provide high lift efficiency over a wide range of forward speed.

It should be noted that the centre of lift along the longitudinal axis of the aircraft should be approximately coincident with the centre of lift of the wing panels as used either in aircraft 28 or 77 and thus should be approximately coincident with the centre of gravity along the longitudinal axis. By approximating the forces to be coincident, large turning moments about the pitch axis of the craft are avoided.

With reference to FIGURE 10 a further configuration of an aircraft is illustrated wherein the aircraft as indicated at 87 is provided with the inboard wing panels 88 and 89 and the reaction engines as at 90 and 91, these portions of the aircraft being similar to that as shown in FIGURE 4, FIGURE 5 and FIGURE 6.

The outer wing panels 92 and 93 support the reaction engine packages 94 and 95 respectively, these engines being mounted on the outer wing panels as opposed to the rear fuselage mount as shown in previous drawings for aircraft 28.

It should be noted that the engine packages 94 and 95 are of variable thrust direction type and are provided with the exhaust nozzles 96 and 97 for package 94 and 98 and 99 for package 95 whereby the direction of the thrust of the packages can be altered from suitable controls located within the cabin. Thus during take-off and landing the thrust reaction from the engines can be directed to maneuver the aircraft as well as to supply thrust for forward movement and eventual sustained flight on the outer wing panels 92 and 93.

Referring to FIGURE 11 another embodiment of the present invention is illustrated and indicated generally as 100. The aircraft 100 is provided with the wing panels 101 and 102 which are of a high speed configuration and is also provided with the vertical lift engines as at 103 and 104 these being similar to the engines as provided for the aircraft 28. Forward movement of the aircraft is provided by means of the engine packages 105 and 106 these being of a comparatively high speed type to match the performance of the aircraft with regard to the configuration of the wing panels 101 and 102.

In FIGURES 12 and 13 a further configuration of the aircraft according to the present invention is illustrated, the aircraft being designated generally as 107. The fuselage portion 108 is provided with a pair of inner wing panels 109 and 110 which incorporate the vertical jet assemblies 111 and 112. The aircraft 107 is similar in many respects to the aircraft 28 but is provided with the outer wing panels 113 and 114 which support the tip mounted engine packages 115 and 116 respectively.

The engine packages 115 and 116 are similar in operation to the packages 94 and 95 as shown in FIGURE 10 but are in this case on aircraft 107 mounted vertically one above the other. The effluxes from the engines as indicated by the arrow 117 and 118 are generally directed downwardly to aid in vertical thrust but also can be ejected rearwardly in order to provide the forward thrust for the aircraft.

From the foregoing it will be seen that the present invention provides vertically augmented thrust, whereby the short take-off and landing characteristics of VTOL winged aircraft are enhanced. The vertically directed air stream extending below the fuselage portion and along the length thereof provides additional thrust during the take-off and landing of the aircraft to combine the high performance of vertical take-off aircraft with the economy of the short take-off configuration.

What I claim is:

1. A winged aircraft adapted for flight at cruising speeds by virtue of forward thrust and airfoil lift and having a fuselage and wing surfaces and means for creating thrust to lift and sustain the aircraft for take-off, hovering and landing and comprising in combination: port and starboard jet thrust generators on said aircraft located to direct jet thrust gases downwardly and inwardly over undersurfaces of said fuselage and embodying nozzle means tangentially spaced outboard of said fuselage for jump-Coanda effect; variable gate means adapted to seal said nozzles from the atmosphere when closed thereby defining portions of wing contours and when opened to induct large quantities of air to said surfaces thereby to augment said jets effecting the pumping of large quantities of air by said jets as port and starboard streams toward undersurfaces of said fuselage; and keel structure longitudinally below the longitudinal axis of said fuselage deflecting the port and starboard streams of quantities of air entrained under said fuselage to join below said structure to provide a vertical downward thrust thereby substantially directly below the longitudinal axis of the fuselage.

2. A winged aircraft as claimed in claim 1 embodying jump Coanda vertical thrust structure as set forth in which a plurality of jet thrust engines are mounted in each of the port and starboard wing elements.

3. A winged aircraft as claimed in claim 1 and inboard wing elements extending for a major portion of the length of the fuselage and a plurality of jet engines therein each embodying a jet nozzle spaced from the fuselage and directed toward the undersurfaces thereof.

4. A winged aircraft as claimed in claim 1 and embodying at least two-lift-cruise engines each of said engines including thrust directing means adapted to be controlled by an operator to direct the thrust thereof selectively downwardly and rearwardly.

5. A winged aircraft as claimed in claim 1 in which the wing elements are extensible.

References Cited

UNITED STATES PATENTS

| | | | |
|---|---|---|---|
| 2,918,233 | 12/1959 | Lippisch | 244—23 |
| 2,974,904 | 3/1961 | Fielding et al. | 244—42.46 |
| 3,062,483 | 11/1962 | Davidson | 244—42.41 |
| 3,085,770 | 4/1963 | Sutton | 244—23 |
| 3,117,643 | 1/1964 | Cockerell | 244—23 X |
| 3,259,341 | 7/1966 | Steidl | 244—42.41 |

OTHER REFERENCES

Kelly et al.: Blowing-type boundary-layer control as applied to the trailing-edge flaps of a 35° swept-wing airplane, 1958, printed in forty-fourth annual report—National Advisory Committee for Aeronautics—1958 Reports, pp. 799–801 (first 3 pages) (Gov't Printing Office).

MILTON BUCHLER, *Primary Examiner.*

J. E. PITTENGER, *Assistant Examiner.*

U.S. Cl. X.R.

244—42, 55